Figure 1:
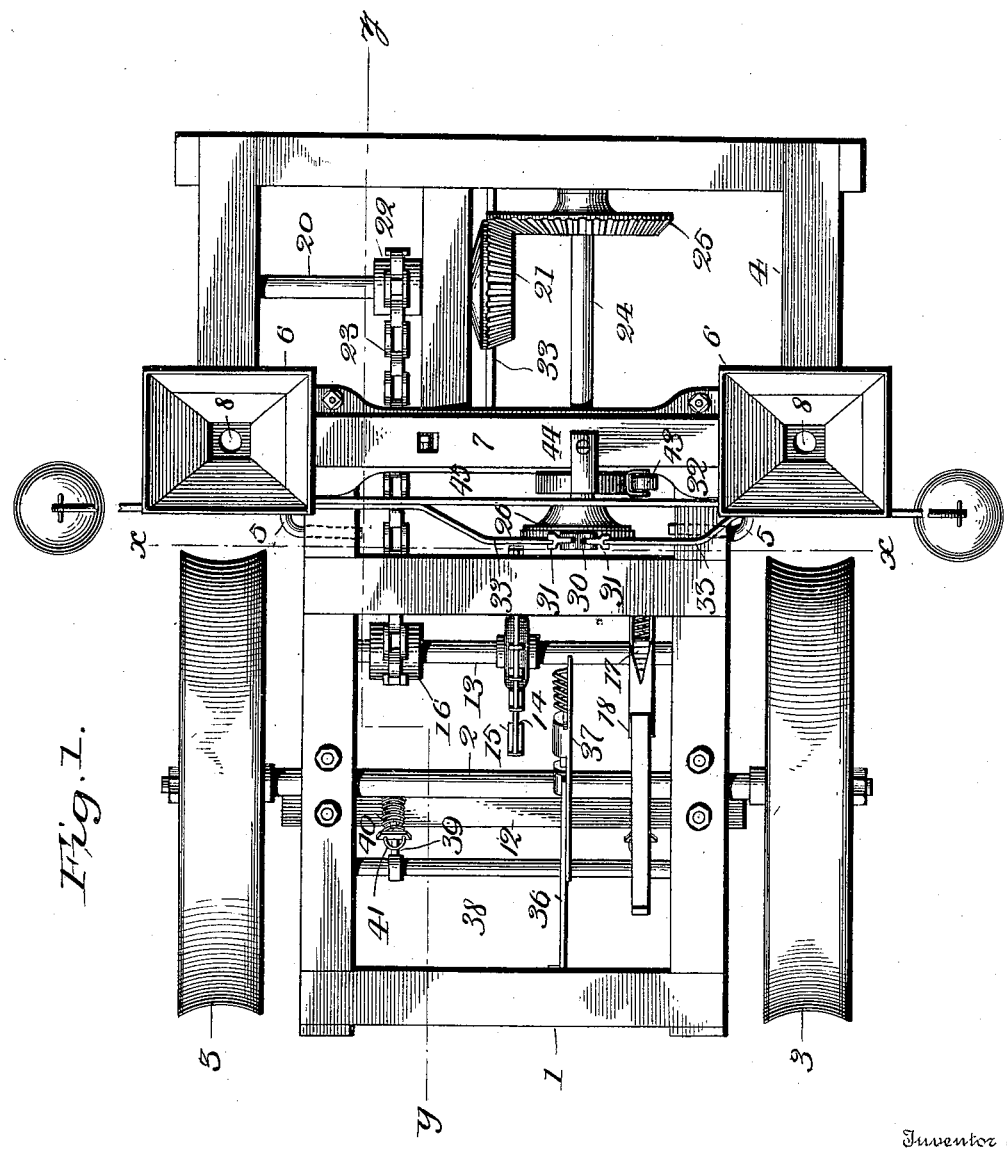

No. 635,715. Patented Oct. 24, 1899.
J. D. DAWSON.
CHECK ROW PLANTER.
(Application filed Mar. 10, 1899.)

(No Model.) 3 Sheets—Sheet 1.

Witnesses
L. C. Hills
R. S. C. Caldwell

Inventor
J. D. Dawson,
By Glanchder
Attorneys

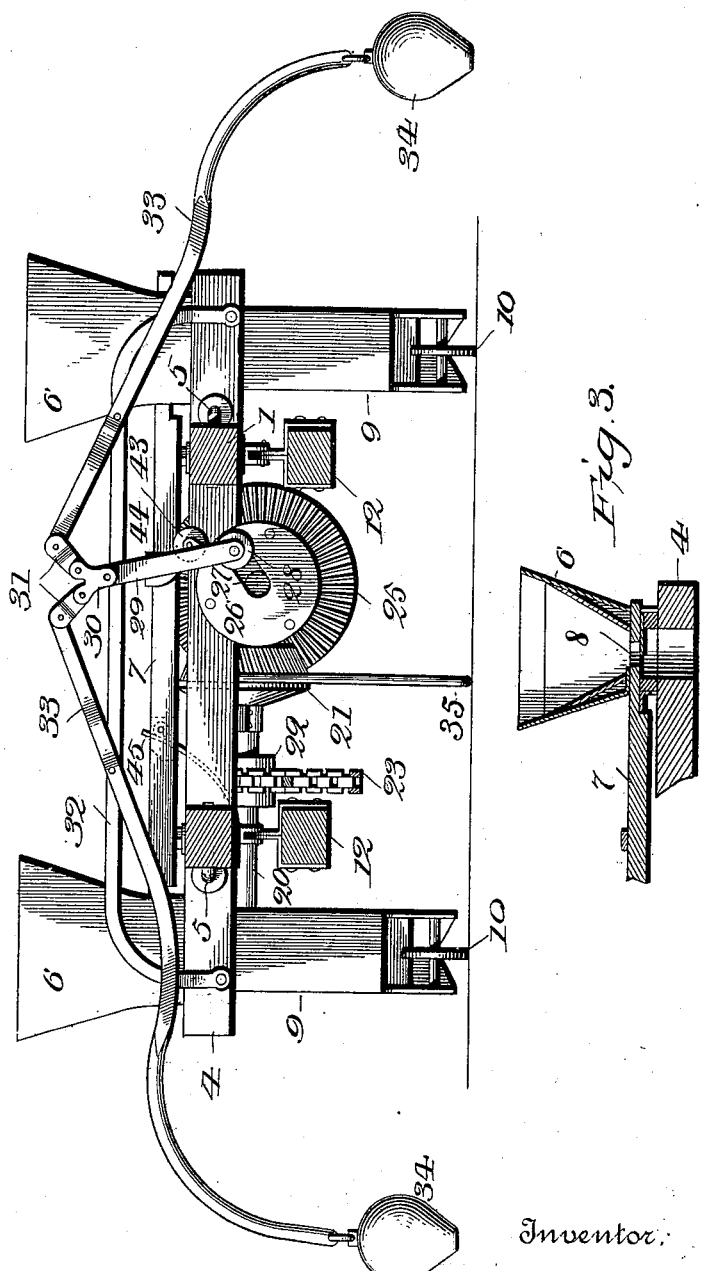

No. 635,715. Patented Oct. 24, 1899.
J. D. DAWSON.
CHECK ROW PLANTER.
(Application filed Mar. 10, 1899.)
(No Model.) 3 Sheets—Sheet 3.
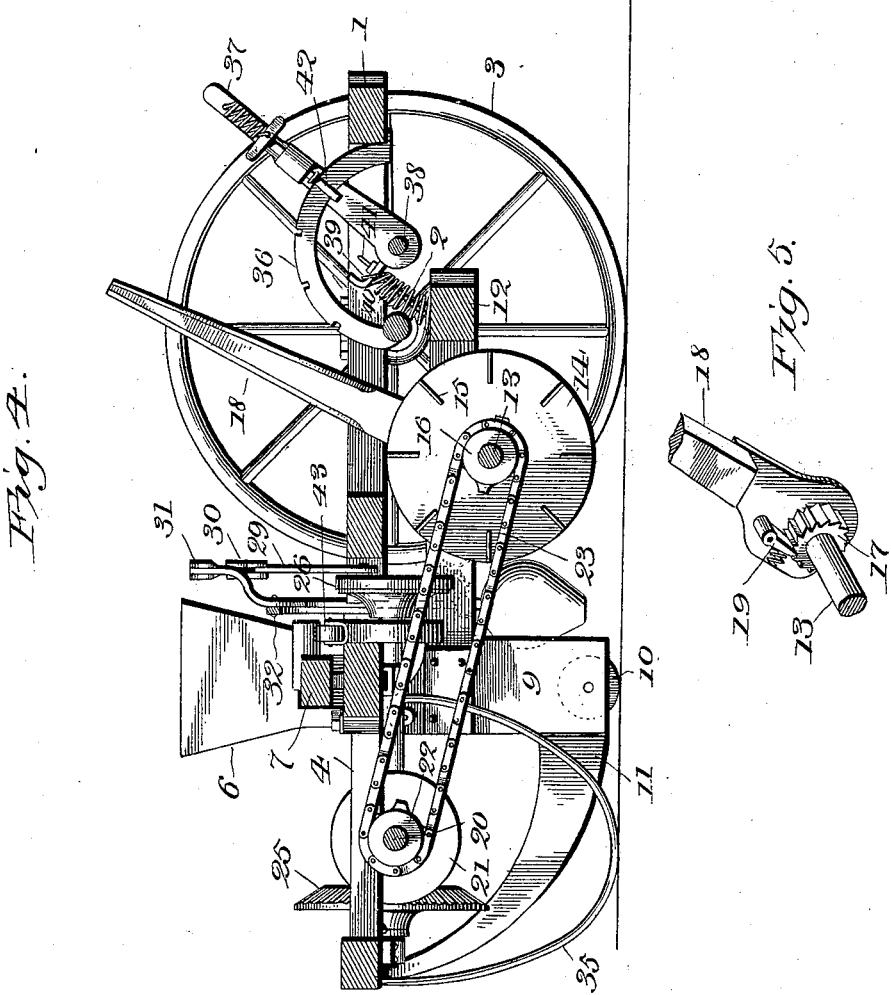
Witnesses
L. C. Hills
R. S. C. Caldwell
Inventor:
J. D. Dawson,
By Glann rhote
Attorney

UNITED STATES PATENT OFFICE.

JEFFERSON DAVIS DAWSON, OF ROCKBRIDGE, ILLINOIS, ASSIGNOR OF ONE-HALF TO R. T. DAWSON, OF ST. LOUIS, MISSOURI, AND PETER E. DAWSON, OF HANCOCK, MARYLAND.

CHECK-ROW PLANTER.

SPECIFICATION forming part of Letters Patent No. 635,715, dated October 24, 1899.

Application filed March 10, 1899. Serial No. 708,543. (No model.)

*To all whom it may concern:*

Be it known that I, JEFFERSON DAVIS DAWSON, a citizen of the United States, residing at Rockbridge, in the county of Greene and State of Illinois, have invented certain new and useful Improvements in Check-Row Planters; and I do hereby declare the following to be a full, clear, and exact description of the invention, such as will enable others skilled in the art to which it appertains to make and use the same.

My invention has relation to check-row planters; and it consists in the novel construction and arrangement of its parts, as hereinafter described.

In the accompanying drawings, Figure 1 is a top plan view of the planter. Fig. 2 is a transverse sectional view cut on the line $xx$ of Fig. 1. Fig. 3 is a sectional view of one of the hoppers used on the planter. Fig. 4 is a sectional view of the planter cut on the line $yy$ of Fig. 1; and Fig. 5 is a perspective view of the lower portion of the adjusting-lever, as will be hereinafter explained.

The frame 1 is mounted on the axle 2. The wheels 3 3 are journaled on the axle 2, the said wheels 3 being broad, as shown in Fig. 1, the rims of the said wheels also being concaved, as shown in the said figure. The front or runner frame 4 is hinged to the forward end of the wheel-frame 1 by means of pins 5, which are secured at their forward ends to the frame 4 and extend back and enter suitable perforations in the forward end of the frame 1, as indicated by dotted lines in Fig. 1. The hoppers 6 6 are mounted on the frame 4, said hoppers being transversely in alinement with each other. The horizontal dropper-bar 7 is also mounted on the frame 4 and is adapted to slide longitudinally thereon. Each end of the bar 7 enters lateral openings in the lower portion of one of the hoppers 6, the said ends being provided with the perforations 8. The perforations 8 are located in the dropper-bar 7, so that when the said bar is moved the grain from both hoppers is dropped simultaneously. Immediately below the outlets of each hopper is located a chute 9, and in the lower ends of said chutes the wheels 10 are journaled. The plows 11 are fixed at their lower ends to the lower portions of the chutes 9 and at their upper ends to the frame 4. A frame 12 is hinged at its forward end, as shown in Fig. 2, under the rear portion of the frame 4, said frame 12 having journaled therein a cross-shaft 13. The wheel 14 is fixed to the middle of the shaft 13, said wheel 14 having the friction-flanges 15 fixed on its sides, near its periphery. A gear-wheel 16 is also fixed on the shaft 13. A ratchet-wheel 17 is fixed on the shaft 13, and the lower end of the lever 18 is connected to the shaft 13, said lever 18 being provided with a spring-actuated pawl 19, said pawl being adapted to engage the ratchet-wheel 17 and revolve the shaft 13 when the lever 18 is operated, as will be hereinafter explained.

The cross-shaft 20 is journaled in the frame 4, said shaft having at its inner end a bevel gear-wheel 21 and at an intermediate point a gear-wheel 22. The chain 23 passes around the gear-wheels 16 and 22. The forwardly-extending shaft 24 is also journaled in the frame 4, said shaft 24 having near its forward end a bevel gear-wheel 25, the said gear-wheel 25 meshing with the gear-wheel 21. To the rear end of the shaft 24 is fixed a disk 26, said disk having an elongated slot 27, said slot extending from the center of the said disk toward the periphery thereof. A friction-roller 28 is located in the slot 27, the said roller being journaled to the lower end of the arm 29. The Y-shaped link 30 is pivoted to the upper end of the arm 29, and the links 31 are pivoted to the upper ends of the Y-shaped links 30.

A yoke 32 is fixed at its ends to the frame 4, and to the said yoke is fulcrumed the levers 33 33, the inner ends of the levers 33 being pivotally connected to the links 31, as shown in Fig. 2. The outer ends of the said levers are curved down and support the weights 34, said weights being linked to the levers, as shown in Figs. 1 and 2. To the under side of the frame and in the middle thereof is secured the downwardly-extending bow 35, said bow being preferably made from an iron rod and being adapted to follow a line made in the ground after the first bout, and thus guide the planter. The tooth-rack 36 is fixed at its forward end to the axle 2 and at its rear end to the rear bar of frame 1. The lever 37 is secured at its lower end to the cross-rod 38, said cross-rod being journaled at its rear ends in the frame 1. The hooks 39 are fixed to the rod 38, said cross-rod being journaled at its ends in the frame 1. The hooks 39 are fixed to the rod 38, the said hooks passing through the coil-springs 40, said coil-springs at their lower ends being attached to the rear end of the frame 12, said coil-springs also surrounding the U-shaped irons 41, as shown in Fig. 1, and the ends of the hooks 39 also passing under said irons, the lower ends of the said irons being secured to the frame 12. The lever 37 is provided with a spring-actuated dog 42, said dog being of ordinary construction and being adapted to engage the teeth of the rack 36, and thus hold the lever 37 in a desired position. On the periphery of the disk 26 is fixed an outwardly-extending arm carrying a friction-roller 43, and on the dropper-bar 7 is fixed a rearwardly-extending lug 44, the roller 43 being adapted to come in contact with the said lug 44 as the disk 26 is revolved, and thus move the dropper-bar 7 longitudinally. This causes the seed to drop simultaneously from the two hoppers 6 6, and it then falls through the chutes 9 upon the ground. After the friction-roller 43 has passed under the lug 44 the spring 45 forces the dropper-bar 7 back to its normal position.

The planter operates as follows: As it is moved over the ground the plows 11 open furrows, the wheels 10 running in the bottoms of the furrows, and in addition to supporting the lower ends of the chutes they press the bottoms of the furrows smooth. The seed drops down the chutes 9, behind the wheels 10, and the wheels 3 close the furrows and press the earth compact on the seed. The wheel 14 runs on the ground and causes the shaft 13 to revolve. The rotary motion is transmitted through the chain 23 to the shaft 20. The gear-wheel 21, fixed on the shaft 20 and meshing with the gear-wheel 25, causes the shaft 24 to revolve, and this in turn revolves the disk 26. As the disk 26 revolves the wheel 43 is brought in contact with the lug 44, and thus the dropper-bar 7 is operated, as above described. The wheel 43 is in such relation to the slot 27 in the disk 26 that when the seed is dropped the weights 34 come in contact with the ground and make dents therein in the next adjoining rows, the dents indicating the spots at which the seed must be dropped to be in alinement with the rows previously planted.

It will be seen that when the disk 26 is in position, as shown in Fig. 2, the lower ends of the weights 34 are close to if not touching the ground. As the said disk 26 revolves and the outer end of the slot 27 is carried down the roller 28 will travel toward the center of the disk, and this will pull the arm 29 down through the links 30 and 31, which will cause the inner ends of the levers 33 to descend and the outer ends of the said levers to rise, and thus lift the weights 34 from the ground. In planting the next rows the rod 35 is caused to follow a row previously planted, and by manipulating the lever 18 the operator can so place the dropper-bar 7 as to cause the subsequent rows to register in alinement. When it is desired to throw the dropping mechanism out of gear, this can be done by throwing the lever 37 to the rear, and the hooks 39, entering the U-shaped rods 41, will lift the rear end of the frame 12, and thus the wheel 14 will be raised above the ground. When the lever 37 is thrown forward, the rear end of the frame 12 is held down by the contact of the lower ends of the hooks 39 with the springs 40, and thus the wheel 14 can ride over any irregularities in the ground, the springs 40 compensating therefor. By hinging the frame 4 to the frame 1 the planter will conform itself to any irregularities in the ground, and thus insure the regular dropping of the seed and the marking of the spots where the seed is to be dropped in the next adjacent rows.

Having described my invention, what I claim as new, and desire to secure by Letters Patent, is—

1. A planter consisting of a main frame mounted on wheels, a second frame hinged to the forward end of the main frame, said second frame carrying suitable hoppers and seed-dropping mechanism, a third frame pivoted at its forward end to the second frame, said third frame carrying a wheel adapted to come in contact with the ground, a lever mounted on the main frame and being connected with the third frame, springs interposed between the lever connections and the third frame, the third frame being adapted to be held down by the tension of said springs, the lever connections adapted to elevate the third frame and connections between the wheel of the third frame and the seed-dropping mechanism.

2. A planter consisting of a main frame mounted on wheels, a second frame hinged to the forward end of the main frame, said second frame carrying suitable hoppers and seed-dropping mechanism, a third frame pivoted at its forward end to the second frame, said third frame carrying a wheel adapted to come in contact with the ground, a lever fulcrumed on the main frame, hooks connected to said lever, U-shaped irons secured at their ends to the third frame, coil-springs surrounding said irons, the said hooks entering the upper ends of said springs and passing between the parallel sides of the U-shaped irons thus forming a connection between the lever and the third frame whereby the said third frame may be raised or lowered, and connections between the wheel of the third frame and the seed-dropping mechanism.

3. A planter consisting of a main frame mounted on wheels, a second frame hinged to the forward end of the main frame and carrying hoppers provided with seed-dropping mechanism, a third frame pivoted to the second frame, a shaft journaled in said third frame, a wheel fixed on said shaft and adapted to come in contact with the ground, connections connecting said shaft with the seed-dropping mechanism, levers fulcrumed on the main frame and extending beyond the sides thereof, said levers being provided at their outer ends with suitable markers, a means for operating said levers, said means being connected with the shaft of the third frame, a ratchet-wheel fixed on the shaft of the third frame, a lever carrying a pawl connected to said shaft, said pawl being adapted to engage the ratchet-wheel.

4. In a planter consisting of suitable framework, wheels having concaved rims supporting said framework, hoppers mounted on the framework and having suitable seed-dropping mechanism, a means for operating said mechanism, chutes located below the outlets of the hoppers, furrow-openers located in front of the chutes, wheels journaled in the lower ends of the chutes, the said chutes being located in front of the wheels provided with the concaved rims.

5. A planter consisting of a framework mounted on wheels, hoppers carried by said framework, a sliding bar forming a dropping device for the hoppers, a lug located on said bar, a spring holding said bar in its normal position, a shaft journaled in the framework, a disk carried by said shaft, said disk having an arm adapted to engage the lug of the dropper-bar and operate the same, a wheel adapted to come in contact with the ground, and an operating means connecting said wheel with the said shaft.

6. A planter consisting of a framework mounted on wheels, hoppers located on the framework and having a dropping mechanism working therein, levers fulcrumed on the framework and extending at their outer ends beyond the sides of the framework being provided with suitable markers, links pivoted to the inner ends of the levers, an arm pivotally connecting the links, a revolving disk having an elongated slot extending from the center thereof toward its periphery, said arm being connected to said disk by entering at its lower end the slot of the disk, and a means for revolving said disk and operating the seed mechanism and the levers simultaneously.

In witness whereof I affix my signature in presence of two witnesses.

JEFFERSON DAVIS DAWSON.

Witnesses:
    GEORGE CLEMENT,
    BARNABAS E. ANTROBUS.